United States Patent [19]
Taranowski et al.

[11] Patent Number: 5,446,281
[45] Date of Patent: Aug. 29, 1995

[54] OPTICAL SENSOR WITH MOVABLE REFRACTION ELEMENT TO ADJUST SENSOR RANGE

[75] Inventors: Michael G. Taranowski, Milwaukee, Wis.; Kenneth A. Langland, Seattle, Wash.; Eugene F. Duncan, Wauwatosa, Wis.; George F. Jambor, Jackson, Wis.; Charles J. Turner, Milwaukee, Wis.

[73] Assignee: Eaton Corporation, Cleveland, Ohio

[21] Appl. No.: 217,499

[22] Filed: Mar. 24, 1994

[51] Int. Cl.$^6$ ............................................. G01V 9/04
[52] U.S. Cl. ........................................ 250/221; 250/239; 356/4.01
[58] Field of Search ............... 250/221, 201.6, 239, 250/561; 356/1, 4, 376

[56] References Cited

U.S. PATENT DOCUMENTS

| | | | |
|---|---|---|---|
| 4,119,379 | 10/1978 | Zindler | 356/4 |
| 4,282,430 | 8/1981 | Hatten et al. | 250/221 |
| 4,306,147 | 12/1981 | Fukuyama et al. | 250/221 |
| 4,412,129 | 10/1983 | Duncan | 250/239 |
| 4,659,922 | 4/1987 | Duncan | 250/221 |
| 4,782,224 | 11/1988 | Haas et al. | 250/221 |
| 4,864,147 | 9/1989 | Ikari et al. | 250/560 |
| 4,899,041 | 2/1990 | Fetzer et al. | 250/222.1 |
| 4,937,460 | 6/1990 | Duncan et al. | 250/561 |
| 5,055,664 | 10/1991 | Ryczek | 250/201.4 |

*Primary Examiner*—David C. Nelms
*Assistant Examiner*—Steven L. Nichols
*Attorney, Agent, or Firm*—Tarolli, Sundheim & Covell

[57] ABSTRACT

An improved optical sensor includes a light source from which light is projected onto an object. A photodetector detects the light reflected from the object. A refraction element is movable relative to the photodetector to vary the range of the optical sensor. The position of the light source relative to the photodetector can be varied.

24 Claims, 4 Drawing Sheets

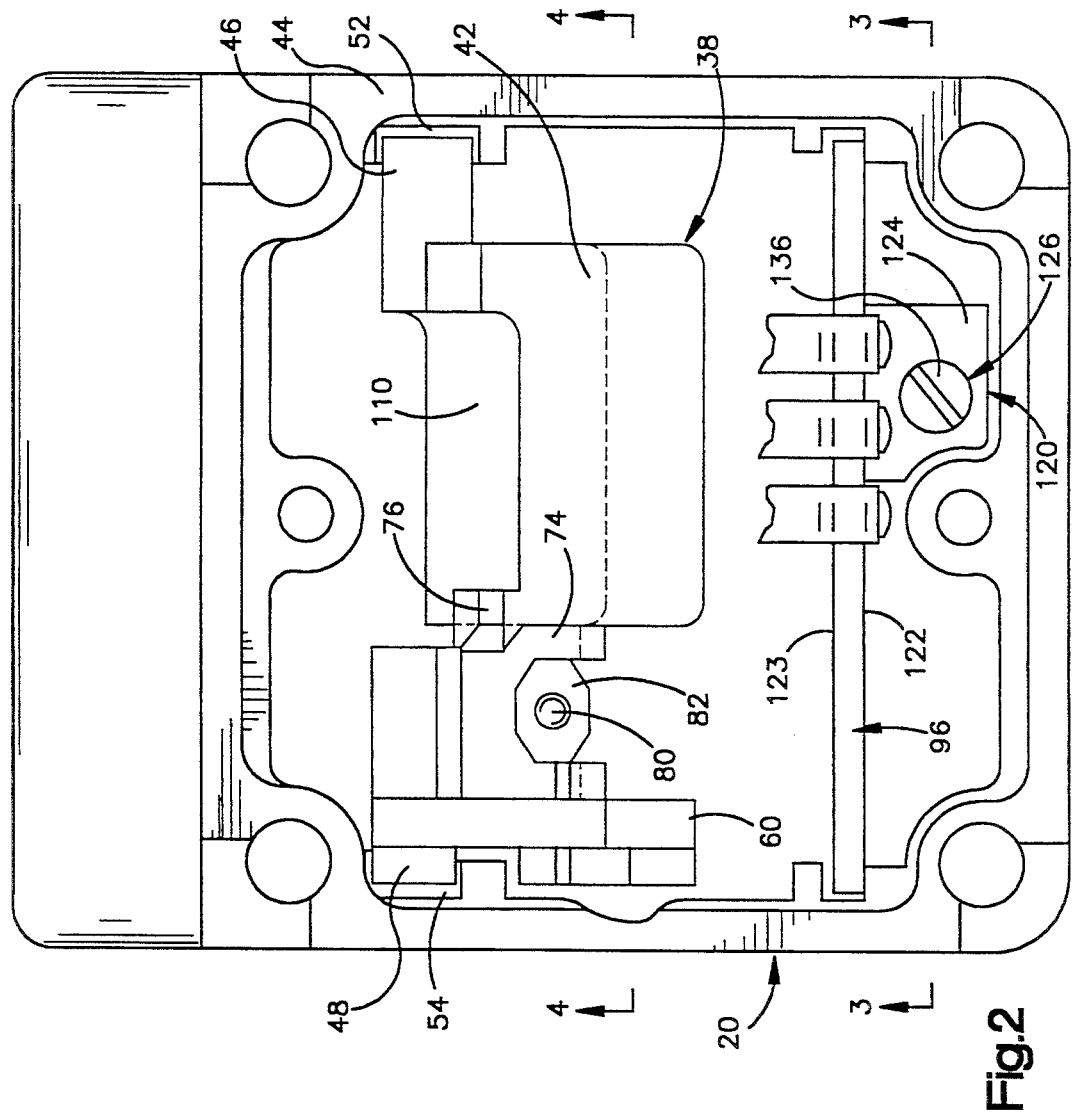
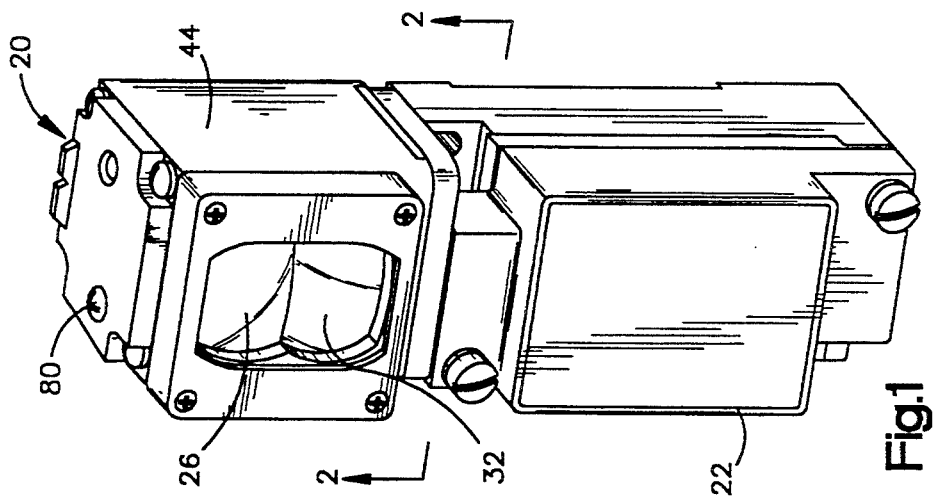
Fig.2
Fig.1

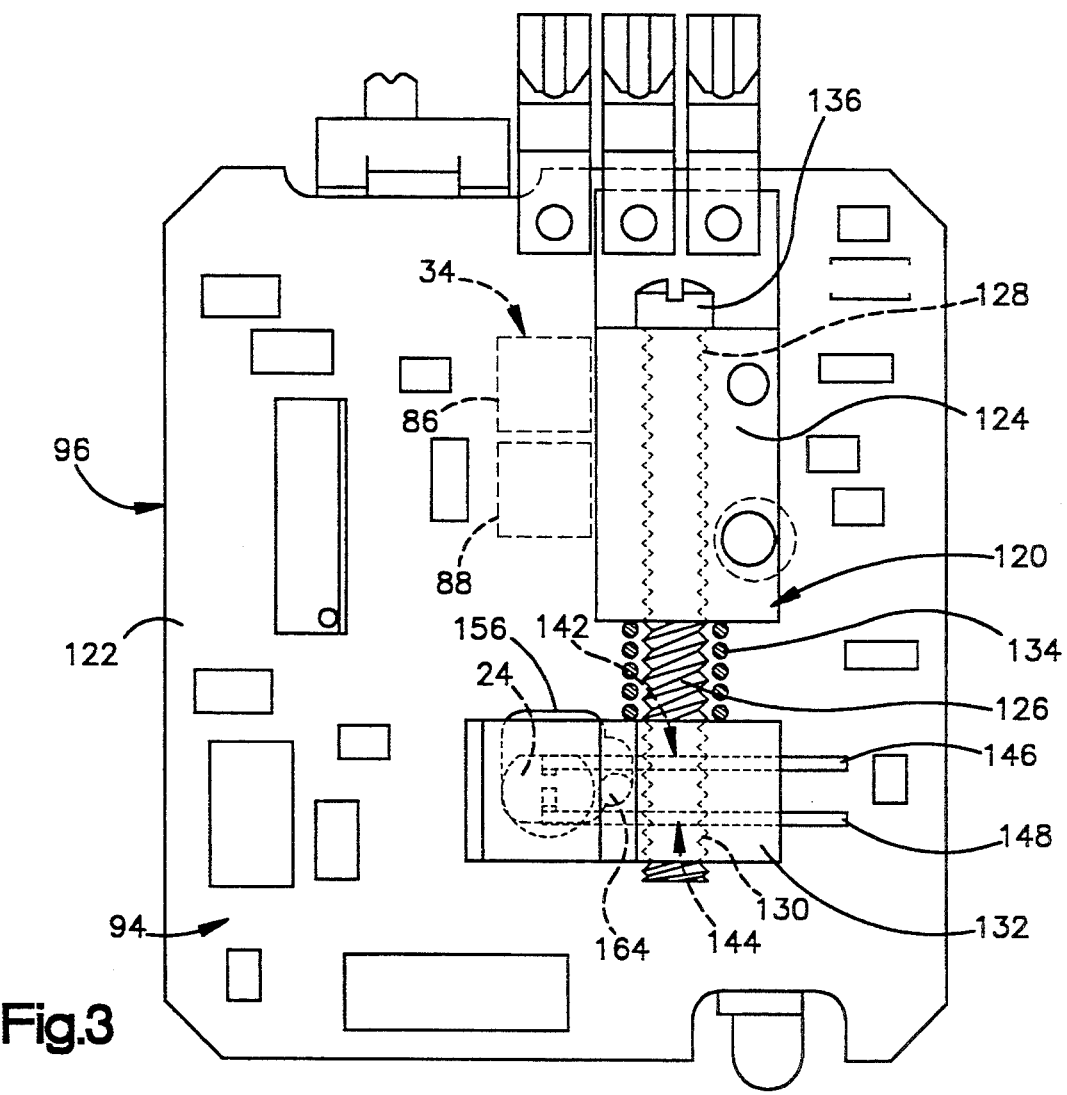

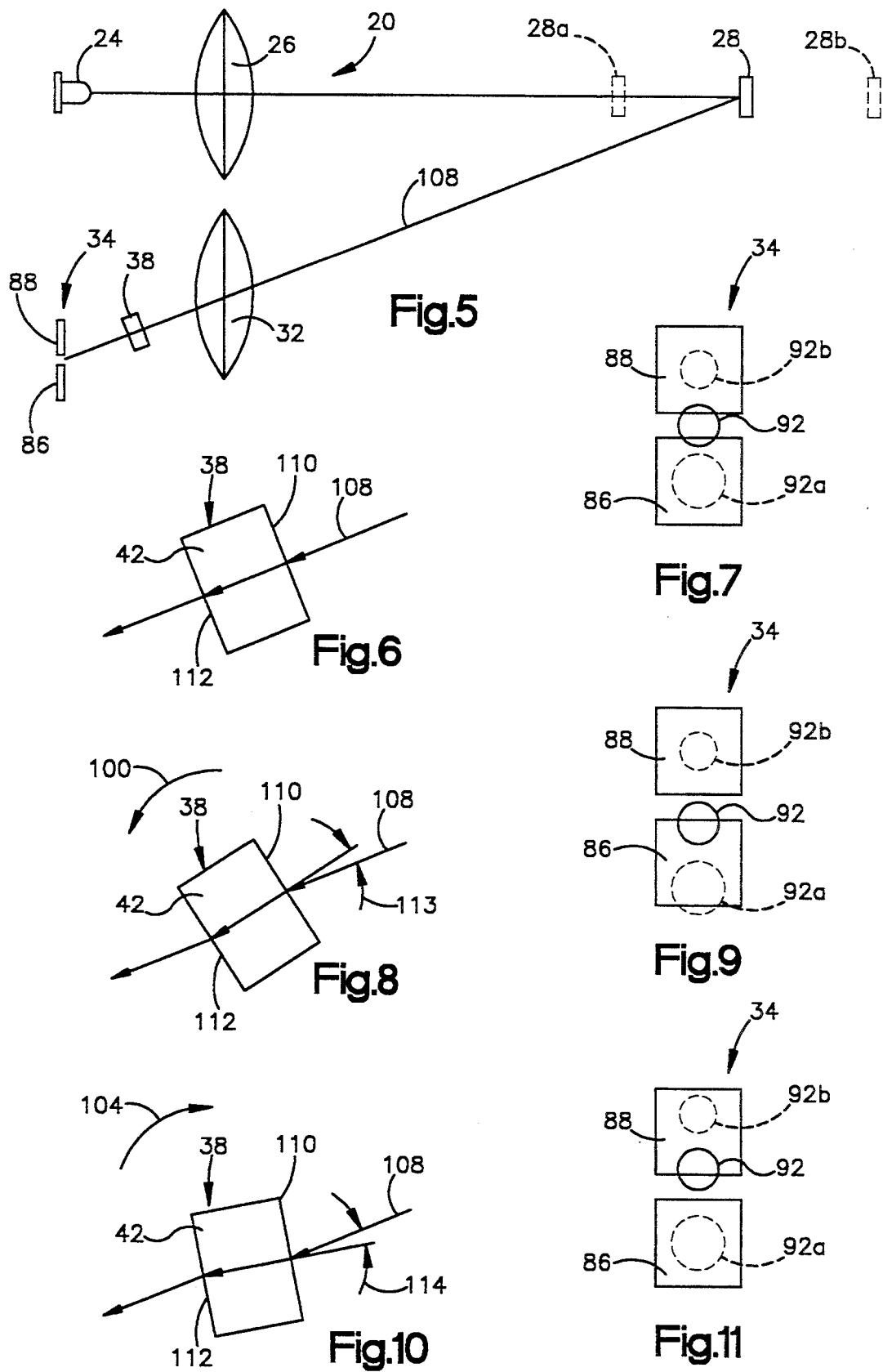

OPTICAL SENSOR WITH MOVABLE REFRACTION ELEMENT TO ADJUST SENSOR RANGE

BACKGROUND OF THE INVENTION

The present invention relates to a new and improved optical sensor and more specifically to an optical sensor which is adjustable.

A known optical sensor is disclosed in U.S. Pat. No. 4,412,129 issued Oct. 25, 1983 to Duncan. The optical sensor disclosed in this patent includes a light source from which light is projected to an object. A photodetector is provided to sense light reflected from the object. When the range of this known optical sensor is to be varied, the position of the light source is varied.

SUMMARY OF THE INVENTION

The present invention relates to an optical sensor which senses light reflected from an object. The range of the optical sensor can be varied by varying the extent to which light reflected from the object is deflected by a refraction element. To change the extent to which light is deflected by the refraction element, an actuator is provided to move the refraction element. In one embodiment of the invention, the refraction element is moved to change the angle of incidence of the reflected light to a side surface of the refraction element. In another embodiment of the invention, the refraction element is moved to change the length of the path of the reflected light through the refraction element.

The optical sensor can also be adjusted by moving the light source. An apparatus for moving the light source includes a member which is disposed between a pair of leads connected to the light source. When the member is moved in a first direction to resiliently deflect a first one of the leads, the light source is moved in one direction. When the member is moved in a second direction to resiliently deflect a second one of the leads, the light source is moved in another direction which is opposite to the one direction.

BRIEF DESCRIPTION OF THE DRAWINGS

The foregoing and other features of the invention will become more apparent upon a consideration of the following description taken in connection with the accompanying drawings wherein:

FIG. 1 is a perspective view of an optical sensor constructed in accordance with the present invention in association with a known solid state limit switch;

FIG. 2 is a simplified plan view of the open bottom side of the sensor housing when removed from the limit switch housing, taken generally along the line 2—2 of FIG. 1, illustrating the relationship of a refraction element to a circuit board in the optical sensor;

FIG. 3 is a plan view, taken generally along the line 3—3 of FIG. 2, illustrating the circuit board and an apparatus for adjusting the position of a light source;

FIG. 4 is a simplified perspective view, taken generally along the line 4—4 of FIG. 2, illustrating the construction of the refraction element;

FIG. 5 is a simplified schematic illustration depicting the relationship of the light source in the optical sensor of FIG. 1 to an object and the relationship of the object to a sensor and to the refraction element of FIG. 4;

FIG. 6 is a schematic illustration further depicting the relationship of the refraction element to light reflected from the object when the refraction element is in an initial position;

FIG. 7 is a schematic illustration depicting the relationship of the reflected light to a pair of photodetectors when the object is at the position shown in FIG. 5 and the refraction element is in the initial position of FIG. 6;

FIG. 8 is a schematic illustration depicting the manner in which the refraction element is rotated to increase the range of the optical sensor;

FIG. 9 is a schematic illustration depicting the relationship of the reflected light to the photodetectors after the refraction element has been rotated to the position shown in FIG. 8 with the object in the position shown in FIG. 5;

FIG. 10 is a schematic illustration depicting the manner in which the refraction element is rotated to decrease the range of the optical sensor;

FIG. 11 is a schematic illustration depicting the relationship of the reflected light to the photodetectors after the refraction element has been rotated to the position shown in FIG. 10 with the object in the position shown in FIG. 5;

DESCRIPTION OF SPECIFIC PREFERRED EMBODIMENTS OF THE INVENTION

Figures 12, 13:
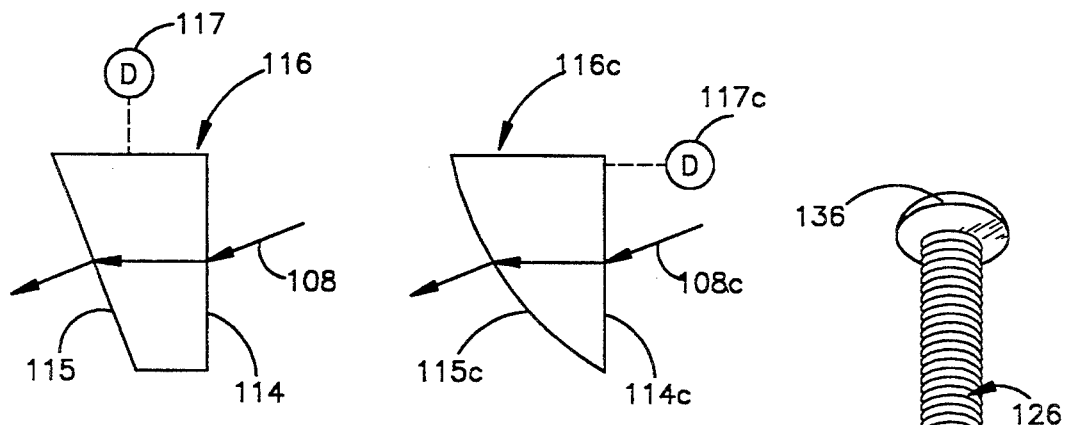
FIG. 12 is a simplified schematic illustration of a second embodiment of the refraction element.
FIG. 13 is a simplified schematic illustration of a third embodiment of the invention.

An improved optical sensor 20, constructed in accordance with the present invention, is illustrated in FIG. 1 in association with a known solid state limit switch 22. Light from a light source 24 (FIGS. 3 and 5) in the optical sensor 20 is transmitted through a projecting lens 26 (FIG. 5) onto an object 28. Light reflected from the object 28 is transmitted through a receiving lens 32 to a sensor 34 disposed in the optical sensor 20.

The optical sensor 20 (FIG. 1) effects operation of the solid state limit switch 22 when the optical sensor detects the presence of the object 28. The optical sensor 20 is connected with the solid state limit switch 22 in the same manner as disclosed in the aforementioned U.S. Pat. No. 4,412,129. The connection between the optical sensor 20 and the solid state limit switch 22 and the construction of the solid state limit switch is the same as in photoelectric sensors which are commercially available from Eaton Corporation, Cutler-Hammer Products, 4201 North 27th St., Milwaukee, Wis. 53216 under the designation of E51 photoelectric sensors.

In accordance with a feature of the present invention, the optical sensor 20 includes a refraction element 38 (FIGS. 2 and 4) through which light reflected from the object 28 (FIG. 5) is transmitted. The refraction element 38 is movable relative to the sensor 34 to change the range of the optical sensor 20. Moving the refraction element 38 relative to the sensor 34 changes the location of the light reflected from the object 28, transmitted through the refraction element and projected onto the sensor 34.

Although it is contemplated that the refraction element 38 could have many different configurations and could be moved in many different ways, in the embodiment of the invention illustrated in FIGS. 2 and 4, the refraction element 38 is formed as one piece and includes a rectangular body 42 of material through which light can be transmitted. The body 42 is formed of transparent material which is optically denser than air. The body 42 of transparent material is pivotally supported by a sensor housing 44 (FIG. 2). In the illustrated embodiment of the invention, the body 42 of transparent material is formed of polycarbonate. Of course, other known materials could be used.

The body 42 of transparent material is formed as one piece with a pair of cylindrical trunions 46 and 48. The trunions 46 and 48 are pivotally supported in the sensor housing 44 in the same manner as are the trunions of the cradle member disclosed in the aforementioned U.S. Pat. No. 4,412,129. Thus, the trunions 46 and 48 are rotatably held in slots 52 and 54 formed in the sensor housing 44 (FIG. 2).

A helical biasing spring (not shown) applies force against a side surface 58 of a spring arm 60 (FIG. 4) to urge the refraction element 38 to rotate in a counterclockwise direction (as viewed in FIG. 4) about an axis 62. A stop surface 66 on a stop arm 68 is engageable with a stop surface in the housing 44 to limit rotational movement of the refraction element 38 in a counterclockwise direction. Similarly, a surface 72 on a second stop arm 74 is engageable with a surface of the housing 44 to limit pivoting movement of the refraction element 38 in a clockwise direction about the axis 62.

An indicator arm 76 extends through a slot (not shown) formed in a cover (not shown) disposed over the open bottom side of the sensor housing 44 between the optical sensor 20 and solid state limit switch 22. The spring arm 60, stop arm 68, stop arm 74, and indicator arm 76 (FIG. 4) are all formed as one piece with the body 42 of transparent material and the trunions 46 and 48. The manner in which the spring arm 60, stop arm 68, stop arm 74 and indicator arm 76 cooperate with the sensor housing 44 (FIG. 2) is the same as is disclosed in the aforementioned U.S. Pat. No. 4,412,129.

A screw 80 (FIGS. 1 and 2) is rotatably mounted in the sensor housing 44 and is operably connected with the refraction element 38 by engagement with a nut 82 on the refraction element. Upon rotation of the screw 80 in one direction, the force applied by the helical coil spring against the spring arm 60 pivots the refraction element 38 in a counterclockwise direction (as viewed in FIG. 4) about the axis 62. Upon rotation of the screw 80 in the opposite direction, the force applied by the screw against nut 82 (FIG. 2) pivots the refraction element 38 in a clockwise direction (as viewed in FIG. 4) about the axis 62 against the influence of the force applied against the spring arm 60 by the coil spring. The screw 80 has a head end portion which is exposed at the exterior of one wall of the optical sensor 20 (FIG. 1). Therefore, the screw 80 can be easily rotated to adjust the position of the refraction element 38 relative to the sensor 34 (FIG. 5).

In FIG. 5, light is projected from the light source 24 through the projecting lens 26. The light reflected from the object 28 is transmitted through the receiving lens 32 and refraction element 38. When the object 28 is at a threshold position shown in solid lines, the reflected light is divided equally between a near photodetector 86 (FIGS. 5 and 7) and a far photodetector 88 in the sensor 34.

Thus, the amount of light which is reflected from the object 28 and impinges on the near photodetector 86 is equal to the amount of light which is reflected from the object and impinges on the far photodetector 88. This is indicated schematically in FIG. 7. The light reflected from the object 28, when it is at the threshold position shown in solid lines in FIG. 5, is indicated by the circle 92 shown in solid lines in FIG. 7.

Control circuitry 94 on a circuit board 96 (FIG. 3) subtracts the output of the far photodetector 88 from the near photodetector 86. When the object 28 is at the threshold position shown in solid lines in FIG. 5, the output from the near photodetector 86 is equal to the output from the far photodetector 88. This is because the light reflected from the object 28 is divided equally between the near photodetector 86 and the far photodetector 88, in the manner indicated schematically by the circle 92 in FIG. 7. Therefore, at this time, the output from the far photodetector 88 cancels the output from the near photodetector 86. The control circuitry 94 of FIG. 3 cooperates with the near photodetector 86 and far photodetector 88 in the same manner as in a Comet 100 Series Perfect PROX (trademark) diffuse reflective sensor which is commercially available from Eaton Corporation, Cutler Hammer Products, 4201 North 27th St., Milwaukee, Wis. 53216.

If the object 28 is closer to the projecting lens 26 than the threshold position, shown in solid lines in FIG. 5, the amount of light reflected to the near photodetector 86 is greater than the amount of light reflected to the far photodetector 88. Therefore, the control circuitry 94 has an output which indicates the presence of the object 28.

When the object 28 is in a near position indicated in dashed lines in 28a in FIG. 5, the light reflected from the object is conducted through the receiving lens 32 and the refraction element 38 to the near photodetector 86, in the manner indicated schematically at 92a in FIG. 7. At this time, the output signal from the near photodetector 86 is substantially greater than the output signal from the far photodetector 88. Therefore, the control circuitry 94 provides an output signal indicating the presence of the object 28.

When the object 28 is further from the projecting lens 26 than the threshold position indicated in solid lines in FIG. 5, a majority of the light reflected from the object through the receiving lens 32 and refraction element 38 is transmitted to the far photodetector 88. When this occurs, the output signal from the control circuitry 94 indicates that an object is not present.

Thus, when the object 28 is at the far position indicated in dashed lines at 28b in FIG. 5, the light reflected from the object is concentrated on the far photodetector 88 in the manner indicated schematically at 92b in FIG. 7. At this time, the output from the far photodetector 88 will be greater than the output from the near photodetector 86. Therefore, the output from the control circuitry 94 will indicate that an object is not within the range of the photoelectric optical sensor 20.

In accordance with a feature of the present invention, the range of the photoelectric optical sensor 20 can be varied by moving the refraction element 38 relative to the sensor 34. Moving the refraction element 38 relative to the sensor 34 changes the extent of deflection of light reflected from the object 28. Varying the extent of deflection of light reflected from the object 28 varies the light transmitted to the near photodetector 86 and the far photodetector 88 for any one position of the object.

When the range of the optical sensor 20 is to be increased, the refraction element 38 is moved to increase the amount of light reflected from the object through the receiving lens 32 and refraction element 38 to the near photodetector 86. Similarly, when the range of the optical sensor 20 is to be decreased, the refraction element 38 is moved to decrease the amount of light reflected from the object 28 through the receiving lens 32 and refraction element 38 to the near photodetector 86. Thus, movement of the refraction element 38 is effective to change the threshold position for the object 28 to a position which is either closer to the projecting lens 26 or further from the projecting lens.

In the illustrated embodiment of the invention, the refraction element 38 is pivoted in a counterclockwise direction, in the manner indicated by the arrow 100 in FIG. 8, to increase the range of the photoelectric optical sensor 20. When the refraction element 38 is pivoted in a counterclockwise direction from the initial position of FIG. 6, the refraction element 38 deflects the reflected light downward, in the manner indicated schematically in FIG. 8. This deflects the light reflected from the object 28 downward toward the near photodetector 86. This results in the establishment of a new threshold position which is further from the projecting lens 26 than the threshold position shown in FIG. 5.

When the refraction element 38 is rotated to the position shown in FIG. 8 with the object 28 in the position shown in solid lines in FIG. 5, the majority of the light reflected from the object 28 will be directed to the near photodetector 86. The manner in which the reflected light is directed to the near photodetector 86 when the refraction element 38 is in the position shown in FIG. 8 is indicated schematically by the circle 92 shown in solid lines in FIG. 9. Since additional reflected light is deflected to the near photodetector 86 by the refraction element 38, the output from the control circuitry 94 will indicate the presence of the object 28 when the object is at the position shown in solid lines in FIG. 5.

The new threshold position at which the amount of light reflected from the object to the near photoelectric sensor equals the amount of light reflected from the object 28 to the far photodetector 88, will be somewhere between the original threshold position for the object 28, shown in solid lines in FIG. 5, and the far position indicated at 28b in FIG. 5. The exact location of the new threshold position will depend upon the extent to which the refraction element 38 is rotated in a counterclockwise direction from the initial position shown in FIG. 6. In one specific embodiment of the invention, the refraction element 38 could be rotated through 12° in a counterclockwise direction from the initial position shown in FIG. 6 to maximize the range of the optical sensor 20.

If the range of the optical sensor 20 is to be decreased, the refraction element 38 is rotated in a clockwise direction from the initial position shown in FIG. 6, in the manner indicated by the arrow 104 in FIG. 10. Rotating the refraction element 38 in a clockwise direction from the initial position shown in FIG. 6 deflects the light reflected from the object 28 away from the near photodetector 86 toward the far photodetector 88. This results in the light reflected from the object 28, when the object is at the position shown in solid lines in FIG. 5, being moved toward the far photodetector 88, in the manner indicated by the circle 92 in FIG. 11.

The new threshold position for the object 28 will be located between the initial threshold position shown in solid lines in FIG. 5 and the near position 28a shown in dashed lines in FIG. 5. The exact location of the new threshold position will depend upon the extent to which the refraction element 38 is rotated in a clockwise direction from the initial position shown in FIG. 6. In the illustrated embodiment of the invention, the refraction element 38 can be rotated through 12° in a clockwise direction from the initial position shown in FIG. 6 to effect a maximum decrease in the range of the optical sensor 20.

The refraction element 38 is rotated in either a clockwise or counterclockwise direction by rotating the actuator screw 80 (FIGS. 1 and 2). Thus, rotation of the actuator screw 80 in one direction effects pivotal movement of the refraction element 38 in a counterclockwise direction from the initial position shown in FIG. 6 toward the actuated position shown in FIG. 8. Similarly, rotation of the actuator screw 80 in the opposite direction effects pivotal movement of the refraction element 38 in a clockwise direction from the initial position of FIG. 6 toward the actuated position shown in FIG. 10. The axis 62 (FIG. 4), about which the refraction element 38 pivots, extends perpendicular to the path of the light reflected from the object 28.

When the refraction element 38 is in the initial position of FIG. 6, a light beam 108 reflected from the object 28 at the threshold position indicated in solid lines in FIG. 5, is conducted through the receiving lens 32 and extends perpendicular to a flat major side surface 110 of the body 42 of transparent material forming the refraction element 38. Since the light beam 108 extends perpendicular to the side surface 110 of the refraction element 38, the light beam is transmitted through the refraction element to the opposite side surface 112 without being deflected. The light beam 108 is then conducted to the sensor 34 in the manner illustrated schematically by the circle 92 in FIG. 7.

The flat side surface 110 on the body 42 of transparent material extends parallel to the flat side surface 112 (FIG. 6). The axis 62 (FIG. 4) about which the body 42 of transparent material rotates is offset from the body of transparent material and extends parallel to the flat side surfaces 110 and 112. However, the refraction element 38 could be constructed so as to rotate about an axis 62 which extends through the body 42 of transparent material.

When the refraction element 38 is rotated in a counterclockwise direction to the actuated position of FIG. 8, the angle of incidence, indicated at 113 in FIG. 8, of the light beam 108 has increased to approximately 12°. Since the body 42 of transparent material is optically denser than air, the light beam 108 is bent or deflected toward a path extending perpendicular to the major side surface 110 of the body 42 of transparent material. This results in the light beam 108 being deflected downward (as viewed in FIG. 8).

The light beam 108 is transmitted through the body 42 of transparent material toward the sensor 34. Since the light beam 108 has been deflected downward (as viewed in FIG. 8), the light beam is directed toward the near photodetector 86, in the manner indicated by the circle 92 in FIG. 9, even though the object 28 is in the position shown in solid lines in FIG. 5.

When the refraction element 38 is rotated in a clockwise direction from the initial position of FIG. 6 to the fully actuated position of FIG. 10, the light beam 108 has an angle 114 of incidence with the side surface 110 of the body 42 of transparent material. This results in the body 42 of transparent material deflecting the light beam 108 upward (as viewed in FIG. 10). The upward deflection of the light beam 108 results in the light from the object 92 being deflected toward the far photodetector 88. Thus, the light from the object 28, when it is at the position indicated in solid lines in FIG. 5, moves toward the far photodetector 88, in the manner indicated schematically by the circle 92 in FIG. 11.

In the illustrated embodiment of the invention, the major side surface 110 of the body 42 of transparent material in the refraction element 38 is perpendicular to the light beam 108 when the object 28 is at the initial threshold position indicated in solid lines in FIG. 5. However, it is contemplated that the refraction element 38 could be oriented in the housing 44 in such a manner that the major side surface 110 of the body 38 of refraction material is perpendicular to the light beam when the refraction element 38 is pivoted through a maximum extent in a counterclockwise direction in the manner indicated by the arrow 100 in FIG. 8. If this was done, the side surface 110 would be perpendicular to the light beam 108 when the optical sensor 20 has its greatest range. The side surface 110 would then be skewed to have an angle of incidence of approximately 24° to the light beam 108 when the refraction element 38 is adjusted to have a minimum range.

In the embodiment of the invention illustrated in FIGS. 1–11, the body 42 of transparent material in the refraction element 38 has a pair of parallel sides 110 and 112 which are pivoted relative to the sensor 34 to change the range of the optical sensor 20. However, it is contemplated that the refraction element could vary the extent to which the light reflected from the object 28 is deflected in a different manner if desired.

In the embodiment of the invention illustrated in FIG. 12, the side surfaces 114 and 115 of a refraction element 116 are skewed relative to each other rather than being parallel. The extent of travel of the light beam 108 through the refraction element 116 is varied by operating a drive assembly 117 to move the refraction element 116 relative to the sensor. The drive assembly 117 moves the refraction element 116 along a linear path which extends parallel to the side surface 114 of the refraction element. The straight path along which the drive assembly 117 moves the refraction element 116 extends transversely to the light beam 108.

Since the side surfaces 114 and 115 of the refraction element 116 are not parallel to each other, movement of the refraction element along a linear path by the drive assembly 117 varies the length of the path of the light beam 108 through the refraction element 116. Varying the length of the path along which light is transmitted through the refraction element 116 varies the extent to which the light beam 108 is deflected by the refraction element 116. Although it is preferred to form the refraction element 116 with flat major side surfaces 114 and 115, it is contemplated that the refraction element could be formed with irregular or curved surfaces.

In the embodiment of the invention illustrated in FIG. 13, the refraction element is movable along the path of travel of the reflected light beam to vary the location at which the light beam engages the refraction element. Since the embodiment of the invention illustrated in FIG. 13 is generally similar to the embodiment of the invention illustrated in FIG. 12, similar numerals will be utilized to identify similar components, the suffix letter "c" being associated with the numerals of FIG. 13 to avoid confusion.

In the embodiment of the invention illustrated in FIG. 13, a side surface 114c of a refraction element 116c is flat and a side surface 115c is arcuate. The extent of deflection of the light beam 108c is varied by operating a drive assembly 117c to move the refraction element 116c along the path of travel of the light beam 108c. The drive assembly 117c moves the refraction element 116c along a linear path which extends transversely to the side surface 114c of the refraction element. The straight path along which the drive assembly 117c moves the refraction element 116c also extends transversely to the light beam 108c.

Movement of the refraction element 116c along a linear path by the drive assembly 117c varies the location at which the light beam 108c engages the refraction element 116. Varying the location at which the light beam engages the refraction element 116c varies the extent to which the light beam 108c is deflected by the refraction element 116c.

In the illustrated embodiment of the invention, the sensor 34 includes a near photodetector 86 and a separate far photodetector 88. Although it is preferred to use the two separate photoelectric sensors 86 and 88, a single position sensitive detector could be utilized to receive the light from the refraction element 38. The manner in which a single position sensitive detector could be used would be similar to that disclosed in U.S. Pat. No. 5,055,664.

Figure 14:
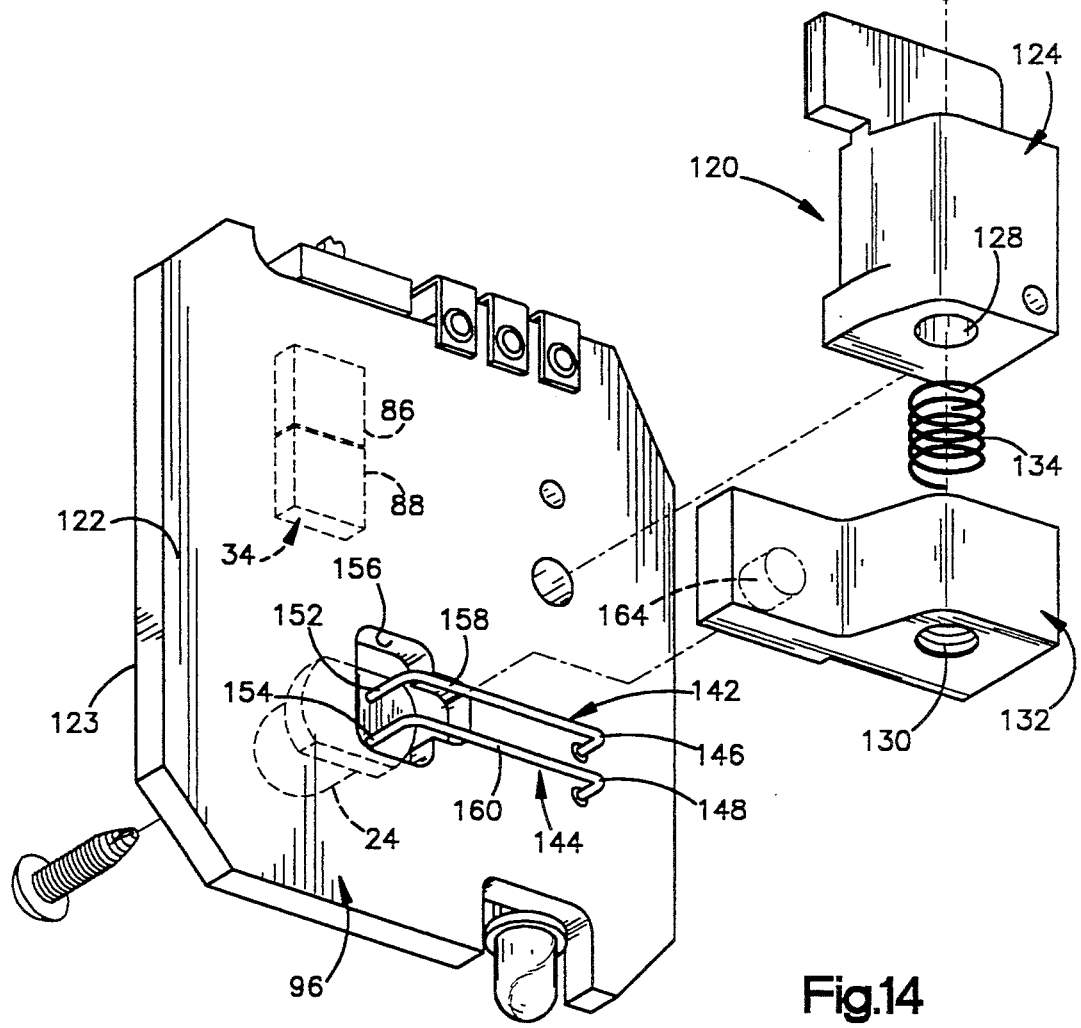
FIG. 14 is a simplified perspective view illustrating the relationship of a light source to a circuit board and an apparatus for moving the light source relative to the circuit board.

It is contemplated that it may be desired to adjust the position of the light source 24 relative to the projecting lens 26 and sensor 34 (FIG. 5). In accordance with another feature of the present invention, an actuator assembly 120 (FIGS. 2, 3 and 14) is provided to move the light source 24 (FIG. 14) relative to the sensor 34. The actuator assembly 120 is mounted on a back side 122 of the circuit board 96. The sensor 34 is mounted on a front side 123 of the circuit board 96. The axis 62 (FIG. 4) about which the refraction element 38 pivots, extends parallel to and is disposed forward of and extends parallel to the front side 123 of the circuit board 96 (FIG. 2).

The actuator assembly 120 includes a base 124 (FIGS. 3 and 14) which is fixedly secured to the back side 122 of the circuit board 96. An actuator screw 126 extends through an unthreaded opening 128 in the base 124. The actuator screw 126 extends into an internally threaded opening 130 formed in an actuator member 132. A coil spring 134 is disposed between the actuator member 132 and the base 124. The coil spring urges the actuator member 132 away from the base 124 and presses a head end portion 136 of the actuator screw 126 against the base 124.

The light source 24 is supported adjacent to the front side 123 (FIG. 14) of the circuit board 96 by a pair of leads 142 and 144. The leads 142 and 144 have end portions 146 and 148 which are fixedly connected to the back side 122 of the circuit board 96. Opposite end portions 152 and 154 of the leads 142 and 144 extend through an opening 156 in the circuit board 96. The end portions 152 and 154 of the leads 142 and 144 are fixedly connected with the light source 24. The leads 142 and 144 have sufficient structural strength to support the light source 24. In the illustrated embodiment of the invention, the light source 24 is a light emitting diode (LED).

The leads 142 and 144 have straight parallel main sections 158 and 160 (FIG. 14) which extend between opposite end portions of the leads. The main sections 158 and 160 of the leads 142 and 144 extend perpendicular to the longitudinal central axis of the actuator screw 126 and to the openings 128 and 130 in the base 124 and actuator member 132.

In accordance with a feature of the actuator assembly 120, the leads 142 and 144 are resiliently deflectable relative to the circuit board 96 by the actuator member 132. Deflection of the leads 142 and 144 moves the light source 24 relative to the circuit board 96. To effect deflection of the leads 142 and 144, the actuator member 132 has a cylindrical force transmitting section 164 which is disposed between and in abutting engagement with the linear main sections 158 and 160 of the leads. The force transmitting section 164 of the actuator member 132 has an upper side surface area which engages the lead 142 and a lower side surface area which engages the lead 144.

Upon rotation of the actuator screw 126 in one direction, the actuator member 132 is moved toward the base 124 against the influence of the spring 134. This causes the force transmitting section 164 to resiliently deflect the main section 158 of the lead 142 upward (as viewed in FIG. 14) toward the sensor 34. Upward deflection of the lead 142 moves the light source 24 toward the sensor 34. As the lead 142 is deflected by the force transmitting section 164 to move the light source 24 toward the sensor 34, force is transmitted from the light source 24 to the end portion 154 of the lead 144 to deflect the lead 144 upward with the lead 142. The opening 156 is large enough to accommodate movement of the end portions 152 and 154 of both leads 142 and 144.

When the light source 24 is to be moved away from the sensor 34, the actuator screw 126 is rotated in the opposite direction. As the actuator screw 126 is rotated in the opposite direction, the coil spring 134 cooperates with the actuator member 132 to move the actuator member away from the base 124. As this occurs, the force transmitting section 164 on the actuator member 132 deflects the main section 160 of the lead 144 downward (as viewed in FIG. 13) away from the sensor 34. This moves the light source 24 away from the sensor. As the light source 24 is moved away from the sensor 34, force is transmitted from the light source to the end portion 152 of the lead 142 to deflect the lead 142 downward with the lead 144.

It is contemplated that the position of the light source 24 will be adjusted at the factory and may subsequently be adjusted only on rare occasions. Therefore, the actuator screw 126 is enclosed by the sensor housing 44 (FIG. 2) and is not readily accessible. Although a single cylindrical force transmitting section 164 is shown disposed between leads 142 and 144, other shapes could readily be used that would individually receive each lead.

Although it is believed to be particularly advantageous to use the refraction element 38 in conjunction with the actuator assembly 120, it is contemplated that the refraction element 38 will be used separately from the actuator assembly 120 and that the actuator assembly 120 will be used separately from the refraction element 38. However, it should be understood that by providing the combination of the refraction element 38 to vary the range of the optical sensor 20 and the actuator assembly 120 to adjust the position of the light source 24, the operating characteristics of the optical sensor 20 can be optimized. Thus, the light source 24 can be precisely set to a desired position and the refraction element 38 can be precisely adjusted to provide the optical sensor with the desired range.

In view of the foregoing description, it is apparent that an optical sensor 20 senses light reflected from an object 28. The range of the optical sensor 20 can be varied by varying the extent to which light reflected from the object 28 is deflected by a refraction element 38. To change the extent to which light is deflected by the refraction element 38, an actuator 80 is provided to move the refraction element. In one embodiment of the invention, the refraction element 38 is moved to change the angle of incidence 113 or 114 (FIGS. 8 and 10) of the reflected light to a side surface 110 of the refraction element. In another embodiment of the invention, the refraction element 116 (FIG. 12) is moved to change the length of the path of the reflected light through the refraction element.

The range of an optical sensor 20 can also be adjusted by moving the light source 24. An apparatus 120 (FIG. 14) for moving the light source 24 includes a member 164 which is preferably disposed between a pair of leads 142 and 144 connected with the light source 24. When the member 164 is moved upward (as viewed in FIG. 14) to resiliently deflect the lead 142 upward, the light source 24 is moved upward. When the member 164 is moved downward (as viewed in FIG. 14) to resiliently deflect the lead 144, the light source 24 is moved downward.

Having described the invention, the following is claimed:

1. An optical sensor comprising means for projecting light to an object, sensor means for sensing light reflected from the object, and refraction means for changing the location of the reflected light upon said sensor means, said refraction means including a body of material through which the light reflected from the object is transmitted along a linear path which extends from a first side surface through which the light reflected from the object enters said body of material to a second side surface through which the light reflected from the object leaves said body of material and means for moving said body of material relative to said sensor means to change the angle of incidence of the light to said first side surface of said body of material.

2. An optical sensor as set forth in claim 1 wherein said means for moving said body of material to change the angle of incidence of the light to said first side surface of said body of material includes means for pivoting said body of material about an axis extending transversely to a path along which the light travels toward said sensor means.

3. An optical sensor as set forth in claim 1 wherein said sensor means includes a first photodetector and a second photodetector, said optical sensor further including means for subtracting an output signal representative of the output of said second photodetector from an output signal representative of the output of said first photodetector.

4. An optical sensor as set forth in claim 3 wherein said means for changing the angle of incidence of the light to said first side surface of said body of material is operable to move said body of material in a first direction to change the angle of incidence of the light to said first side surface of the body of material to deflect light transmitted from said second side surface of the body of material toward said first photodetector and is operable to move said body of material in a second direction to change the angle of incidence of the light to said first side surface of said body of material to deflect the light transmitted from said second side surface of the body of material toward said second photodetector.

5. An optical sensor as set forth in claim 1 wherein said means for projecting light includes a source of light and a lens, said optical sensor further including means for moving said source of light relative to said lens.

6. An optical sensor as set forth in claim 1 wherein said body of material is disposed between said sensor means and the object so that light reflected from the object is transmitted through said body of material.

7. An optical sensor as set forth in claim 1 further including a base, said means for projecting light including a source of light, a pair of electrical leads connected with said source of light and with said base, said source of light being energized by electrical energy conducted to said source of light by said pair of electrical leads, said source of light being supported by said pair of electrical leads, and means for moving said pair of electrical leads relative to said base to thereby move said source of light relative to said base.

8. An optical sensor as set forth in claim 7 wherein said means for moving said pair of electrical leads relative to said base includes a member which extends into a space between said electrical leads and means for moving said member relative to said base.

9. An optical sensor comprising means for projecting light to an object, sensor means for sensing light reflected from the object, and refraction means for deflecting the light reflected from the object relative to said sensor means, said refraction means including a body of material through which the light reflected from the object is transmitted along a linear path which extends from a first side surface through which the light reflected from the object enters said body of material to a second side surface through which the light reflected from the object leaves said body of material and means for moving said body of material relative to said sensor means to vary the extent to which the light is deflected relative to said sensor means during passage of the light through said body of material.

10. An optical sensor as set forth in claim 9 wherein said body of material includes means for moving said body of material to change the angle of incidence of the light to said first side surface.

11. An optical sensor as set forth in claim 9 wherein said means for moving said body of material includes means for moving said body of material from a first position in which the linear path along which the light travels through said body of material has a first length to a second position in which the linear path along which the light travels through said body of material has a second length which is different than the first length.

12. An optical sensor as set forth in claim 9 wherein said means for moving said body of material is operable to move said body of material to change the distance through which the reflected light travels between said first and second side surfaces.

13. An optical sensor as set forth in claim 9 further including a circuit board, said means for projecting light including a source of light, a first resiliently deflectable lead having a first end portion connected with said source of light and a second end portion connected with said circuit board, a second resiliently deflectable lead having a first end portion connected to said source of light and a second end portion connected to said circuit board, a member at least partially disposed between said first and second leads, and actuator means for moving said member in a first direction relative to said circuit board to apply force to said first lead at a location between said first and second end portions of said first lead to resiliently deflect said first and second leads and move said light source relative to said circuit board, said actuator means being operable to move said member in a second direction relative to said circuit board to apply force to said second lead at a location between said first and second end portions of said second lead to resiliently deflect said first and second leads and move said light source relative to said circuit board.

14. An optical sensor as set forth in claim 13 wherein said sensor means includes a photodetector mounted on a first side of said circuit board, said light source being at least partially disposed adjacent said first side of said circuit board and being effective to project light away from said first side of said circuit board toward the object, said first and second leads being at least partially disposed adjacent to a second side of said circuit board, said member being disposed adjacent to said second side of said circuit board and being engageable with said first and second leads at a location adjacent to said second side of said circuit board.

15. An optical sensor as set forth in claim 13 wherein said light source is effective to transmit force from said first lead to said second lead to resiliently deflect said second lead upon resilient deflection of said first lead by movement of said member in the first direction, said light source being effective to transmit force from said second lead to said first lead to resiliently deflect said first lead upon resilient deflection of said second lead by movement of said member in the second direction.

16. An optical sensor as set forth in claim 9 wherein said means for moving said body of material includes means for pivoting said body of material about an axis extending transversely to a path along which the light travels to said sensor means.

17. An optical sensor as set forth in claim 9 wherein said body of material is disposed between said sensor means and the object so that light reflected from the object is transmitted through said body of material.

18. An optical sensor comprising means for projecting light to an object, said means for projecting light including a light source which is activated by electrical energy and first and second resiliently deflectable leads connected with said light source to form a portion of an electrical circuit which conducts electrical energy to said light source, sensor means for sensing light reflected from the object, and means for moving said light source relative to said sensor means, said means for moving said light source including a member which is engageable with said first and second leads, and actuator means for moving said member in a first direction to apply force to said first lead to resiliently deflect said first lead and move said light source in one direction relative to said sensor means, said actuator means being operable to move said member in a second direction to apply force to said second lead to resiliently deflect said second lead and move said light source relative to said sensor means in another direction which is opposite to the one direction.

19. An optical sensor as set forth in claim 18 further including refraction means for changing the location of engagement the reflected light with said sensor means, said refraction means including a body of material through which the reflected light is transmitted along a linear path and means for moving said body of material to change the angle of incidence of the reflected light to a side surface of the body of material.

20. An optical sensor as set forth in claim 18 further including refraction means for deflecting the reflected light relative to said sensor means, said refraction means including a body of material through which the reflected light is transmitted along a linear path, and means for moving said body of material relative to said sensor means to vary the extent to which the reflected light is deflected relative to said sensor means during passage of the reflected light through said body of material.

21. An optical sensor as set forth in claim 18 wherein said first lead has a straight longitudinally extending portion and said second lead has a straight longitudinally extending portion, said member having a first side surface area which is engageable with said straight longitudinally extending portion of said first lead and a second side surface area which is engageable with said straight longitudinally extending portion of said second lead.

22. An optical sensor as set forth in claim 18 further including a circuit board, said first lead having a first end portion connected with said circuit board, a second end portion connected with said light source and an intermediate portion extending between said first and second end portions of said first lead, said second lead having a first end portion connected with said circuit board, a second end portion connected with said light source and an intermediate portion extending between said first and second end portions of said second leads, said actuator means being operable to press said member against said intermediate portion of said first lead to resiliently deflect said intermediate portion of said first lead and move said light source in the one direction relative to said circuit board, said actuator means being operable to press said member against said intermediate portion of said second lead to resiliently deflect said intermediate portion of said second lead and move said light source in the other direction relative to said circuit board.

23. An optical sensor as set forth in claim 22 wherein said circuit board includes surface means for defining an opening which extends between first and second major sides of said circuit board, said light source being at least partially disposed adjacent to the first major side of said circuit board and being energizeable by electric energy conducted through said first and second leads to project light away from the first major side of said circuit board toward the object, said first and second leads being at least partially disposed adjacent to the second major side of said circuit board.

24. An optical sensor as set forth in claim 22 wherein said light source transmits force from said second end portion of said first lead to said second end portion of said second lead to resiliently deflect said intermediate portion of said second lead upon operation of said actuator means to press said member against said intermediate portion of said first lead to move said light source in the one direction, said light source transmits force from said second end portion of said second lead to said second end portion of said first lead to resiliently deflect said intermediate portion of said first lead upon operation of said actuator means to press said member against said intermediate portion of said second lead to move said light source in the other direction.

* * * * *

UNITED STATES PATENT AND TRADEMARK OFFICE
CERTIFICATE OF CORRECTION

PATENT NO. : 5,446,281

DATED : August 29, 1995

INVENTOR(S) : Michael G. Taranowski, Kenneth A. Langland, Eugene F. Duncan, George F. Jambor and Charles J. Turner It is certified that error appears in the above-indentified patent and that said Letters Patent is hereby corrected as shown below:

Column 13, line 31, change "leads" to --lead--.

Signed and Sealed this

Twelfth Day of March, 1996

Attest:

BRUCE LEHMAN

Attesting Officer

Commissioner of Patents and Trademarks